US011876839B2

(12) United States Patent
Merino Vazquez et al.

(10) Patent No.: US 11,876,839 B2
(45) Date of Patent: Jan. 16, 2024

(54) METHODS AND APPARATUS FOR SELECTING A SERVING SESSION CONTROL NODE IN AN INTERNET PROTOCOL MULTIMEDIA SUBSYSTEM, IMS, TELECOMMUNICATION NETWORK FOR A USER EQUIPMENT

(71) Applicant: Telefonaktiebolaget LM Ericsson (publ), Stockholm (SE)

(72) Inventors: Emiliano Merino Vazquez, Madrid (ES); Cristina Ruiz Balmaseda, Madrid (ES); Jesus Angel De Gregorio Rodriguez, Madrid (ES)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 17/781,979

(22) PCT Filed: Apr. 1, 2020

(86) PCT No.: PCT/EP2020/059245
§ 371 (c)(1),
(2) Date: Jun. 2, 2022

(87) PCT Pub. No.: WO2021/110289
PCT Pub. Date: Jun. 10, 2021

(65) Prior Publication Data
US 2023/0007055 A1   Jan. 5, 2023

(30) Foreign Application Priority Data
Dec. 5, 2019 (EP) ..................................... 19383087

(51) Int. Cl.
*H04L 65/1016* (2022.01)
*H04L 65/1073* (2022.01)
(Continued)

(52) U.S. Cl.
CPC ...... *H04L 65/1046* (2013.01); *H04L 65/1016* (2013.01); *H04L 65/1059* (2013.01); *H04L 65/1073* (2013.01)

(58) Field of Classification Search
CPC ............. H04L 65/1046; H04L 65/1016; H04L 65/1059; H04L 65/1073; H04L 67/63
(Continued)

(56) References Cited

U.S. PATENT DOCUMENTS 11,463,868 B2 * 10/2022 Van Lieshout ......... H04W 8/08
2014/0229928 A1 * 8/2014 Edstrom ................. G06F 8/656
717/171

(Continued)

FOREIGN PATENT DOCUMENTS

CN    101855886 A    10/2010

OTHER PUBLICATIONS

International Search Report and Written Opinion dated Jun. 17, 2020 for International Application No. PCT/EP2020/059245 filed Apr. 1, 2020, consisting of 15 pages.
(Continued)

*Primary Examiner* — Karen C Tang
(74) *Attorney, Agent, or Firm* — Christopher & Weisberg, P.A.

(57) ABSTRACT

Selecting a serving session control node in an Internet Protocol, IP, Multimedia Subsystem, IMS, telecommunication network, for a User Equipment. The method includes receiving, by an interrogating session control node, a Session Initiation Protocol, SIP register message for registering said UE in said IMS telecommunication network, the SIP register message has a UE capability feature mappable to a UE initiated server capability for the serving session control node, transmitting, by the interrogating session control node, to a Home Subscriber Server, a user authorization request
(Continued)

message comprising the UE capability feature, receiving, by the interrogating session control node, from the Home Subscriber Server, a user authorization answer message including one or more UE initiated server capabilities for a serving session control node, selecting, by the interrogating session control node, a serving session control node based on the one or more received UE initiated server capabilities in the user authorization answer message.

12 Claims, 5 Drawing Sheets

(51) Int. Cl.
*H04L 65/1046* (2022.01)
*H04L 65/1059* (2022.01)

(58) Field of Classification Search
USPC .......................................................... 709/224
See application file for complete search history.

(56) References Cited

U.S. PATENT DOCUMENTS

| | | | | |
|---|---|---|---|---|
| 2016/0226923 | A1* | 8/2016 | Purkop | H04L 65/1063 |
| 2017/0104795 | A1* | 4/2017 | Gundavelli | H04L 65/1104 |
| 2017/0288886 | A1* | 10/2017 | Atarius | H04L 47/20 |
| 2018/0091971 | A1* | 3/2018 | Liang | H04L 65/1016 |
| 2019/0312916 | A1* | 10/2019 | Siddappa | H04L 65/1073 |
| 2019/0313319 | A1* | 10/2019 | Qiao | H04W 48/02 |
| 2020/0204990 | A1* | 6/2020 | Raghunathan | H04L 65/403 |
| 2021/0044633 | A1* | 2/2021 | John | H04L 65/1073 |
| 2022/0131908 | A1* | 4/2022 | Oyman | H04L 65/756 |
| 2022/0150809 | A1* | 5/2022 | Guo | H04W 48/18 |

OTHER PUBLICATIONS

SA WG2 Meeting #131 S2-1902499; Title: Support for RLOS in IMS; Source to WG: Ericsson, Nokia; Source to TSG: SA2; Work item code: PARLOS_SA2; Location and Date: Santa Cruz de Tenerife, Spain, Feb. 25-Mar. 1, 2019, consisting of 7 pages.

3GPP TSG SA WG2 Meeting #77 TD S2-100259; Title: Use of LDF in S-CSCF re-selection required Alternatives 1 and 2; Source: Nokia Siemens Networks, China Mobile, China Unicom; Document for: Approval; Agenda Item: 8.6.1; Location and Date: Shenzhen, China, Jan. 18-22, 2010, consisting 3 pages.

3GPP TS 23.228 V16.2.0 3rd Generation Partnership Project; Technical Specification Group Services and System Aspects; IP Multimedia Subsystem (IMS); Stage 2 (Release 16); Sep. 2019, consisting of 348 pages.

3GPP TS 24.229 V16.3.0; 3rd Generation Partnership Project; Technical Specification Group Core Network and Terminals; IP multimedia call control protocol based on Session Initiation Protocol (SIP) and Session Description Protocol (SDP); Stage 3 (Release 16); Sep. 2019, consisting of 1060 pages.

3GPP TS 29.228 V16.0.0; 3rd Generation Partnership Project; Technical Specification Group Core Network and Terminals; IP Multimedia (IM) Subsystem Cx and Dx interfaces; Signalling flows and message contents (Release 16); Sep. 2019, consisting of 82 pages.

* cited by examiner

METHODS AND APPARATUS FOR SELECTING A SERVING SESSION CONTROL NODE IN AN INTERNET PROTOCOL MULTIMEDIA SUBSYSTEM, IMS, TELECOMMUNICATION NETWORK FOR A USER EQUIPMENT

CROSS-REFERENCE TO RELATED APPLICATIONS

This application is a Submission Under 35 U.S.C. § 371 for U.S. National Stage Patent Application of International Application No.: PCT/EP2020/059245, filed Apr. 1, 2020 entitled "METHODS AND APPARATUS FOR SELECTING A SERVING SESSION CONTROL NODE IN AN INTERNET PROTOCOL MULTIMEDIA SUBSYSTEM, IMS, TELECOMMUNICATION NETWORK FOR A USER EQUIPMENT," which claims priority to European Application No.: 19383087.4, filed Dec. 5, 2019, the entireties of both of which are incorporated herein by reference.

TECHNICAL FIELD

The present disclosure mainly relates to the field of telecommunication and, more specifically, to methods for selecting a serving session control node in an Internet Protocol, IP, Multimedia Subsystem, IMS telecommunication network.

The server selection, more particularly the S-CSCF, in Intellectual Property, IP, Multimedia Subsystem, IMS, is currently based on the provisioned server capabilities for the User Equipment, UE. These capabilities are chosen by the network operator based on many factors, i.e. S-CSCF features that may be required by the UE, capacity that may be required by the S-CSCF, preferred S-CSCF location, etc. Hence, these provisioned capabilities allow the operator to steer each UE to different S-CSCFs based on these factors.

Currently, the operator defines, possibly based on the functionality offered by each S-CSCF installed in the network, the exact meaning of the S-CSCF mandatory and optional capabilities available in its telecommunication network. It is an operator task to allocate a unique value to represent a single capability, e.g. support of "wildcarded PSI", or a set of capabilities, e.g. support of "alias" and "Shared IFC sets" and "wildcarded PSI", and to use these values to identify capabilities that are mandatory and/or optional to support for a given subscription. It is a configuration task for the operator to ensure that the Interrogating CSCF has a correct record of the capability values received from the Home Subscriber Server, HSS, for each S-CSCF available in his network. The I-CSCF and the HSS may not need to know the semantic of these values. This semantic may exclusively be an operator issue.

One of the downsides of the above described process is that there is not much flexibility in the selection process for selecting a serving session control node in an Internet Protocol, IP, Multimedia Subsystem, IMS, telecommunication network.

SUMMARY

It is an object of the present disclosure to provide for methods and devices for supporting the selection of a serving session control node in an Internet Protocol, IP, Multimedia subsystem, IMS, telecommunication network.

The above described devices may be directed to a Serving Call Session Control Function, S-CSCF, an Interrogating Call Session Control Function, I-CSCF, a Home Subscriber Server, HSS, and an (IMS capable) User Equipment, UE.

In a first aspect of the present disclosure, there is presented a method of selecting a serving session control node in an Internet Protocol, IP, Multimedia Subsystem, IMS, telecommunication network, for a User Equipment. The method comprising the steps of receiving, by an interrogating session control node, a Session Initiation Protocol, SIP register message for registering said UE in said IMS telecommunication network, wherein said SIP register message comprises a UE capability feature mappable to a server capability for said serving session control node, transmitting, by said interrogating session control node, to a Home Subscriber Server, a user authorization request message comprising said UE capability feature, receiving, by said interrogating session control node, from said Home Subscriber Server, a user authorization answer message comprising one or more UE initiated server capabilities for a serving session control node, and selecting, by said interrogating session control node, a serving session control node based on said one or more received UE initiated server capabilities in said user authorization answer message.

It was found that, in the prior art, given that the capabilities are static information provisioned for each User Equipment, UE, as part of the UE's subscription data, the operator may configure certain server capabilities without knowing if the UE eventually will own or buy a UE supporting another feature, for example an RLOS feature as indicated in annex Z in 3GPP TS 23.228, or if a certain feature is activated by the UE or the access network. This results on selecting a serving session control node based on what the UE might eventually support, not based on what the UE actually supports and may require.

It was noted that the interrogating session control node is the node which, upon reception of the server capabilities required/provisioned by the UE, selects a serving session control node, but there is currently no known relationship for the interrogating session control node between the server capabilities required and the UE capabilities. This is because the meaning of the capabilities are only known to the operator.

The above is solved by the present disclosure in that SIP register message, which is sent by the UE for registering the UE in the IMS telecommunication network, comprises a UE capability features which can be mapped to a server capability for the serving session control node. The above enables the Home Subscriber Server to map the UE capability feature to a server capability for the serving session control node. That particular server capability is referred to, in this disclosure, as a UE initiated server capability. The interrogating session control node is than able to select a serving session control node based on the UE initiated server capability which is provided to the interrogating session control node by the Home Subscriber Server.

Following the above, it is a concept of the present disclosure that the UE inserts, in the SIP register message, a feature which can be translated, by the Home Subscriber Server, to a server capability for the serving session control node.

In accordance with the present disclosure, the serving session control node may be the Serving Call Session Control Function, S-CSCF, in an IMS telecommunication network. The interrogating session control node may be the Interrogating Call Session Control Function, I-CSCF, in an IMS telecommunication network.

In an example, the step of receiving further comprises:
receiving, by said interrogating session control node, said user authorization answer message comprising said one or more UE initiated server capabilities as well as an identification of a serving session control node.

The above described example is directed to the concept that the HSS will provide the identification of the serving session control node to the interrogating session control node as well as the UE initiated server capabilities. That is, the HSS is, for example, aware of a serving session control node that was previously associated with the UE and provides an identification, for example the name, of that serving session control node to the interrogating session control node.

Further, the UE initiated server capability of capabilities are also inserted in the user authorization answer message. The interrogating session control node may then double check whether the previously used serving session control node is also equipped, or is also able, to support the UE initiated server capability. If this is the case, the previously used serving session control node may be selected as the serving session control node for the UE.

Following the above, the step of selecting may further comprise:
determining, by said interrogating session control node, that said identified serving session control node is equipped with said one or more UE initiated server capabilities thereby selecting said identified serving session control node.

In an example, the step of selecting further comprises:
determining, by said interrogating session control node, that said identified serving session control node is not equipped with said one or more UE initiated server capabilities,
transmitting, by said interrogating session control node, triggered by said determining step, to said Home Subscriber Server, a user authorization request message comprising a request for server capabilities for said serving session control node as well as comprising said UE capability feature;
receiving, by said interrogating session control node, from said Home Subscriber Server, a user authorization answer message comprising one or more server capabilities as well as said one or more UE initiated server capabilities;
selecting, by said interrogating session control node, a serving session control node based on said one or more received UE initiated server capabilities and based on said one or more server capabilities.

The above described example is directed to the concept that the interrogating session control node received the identification of the previously used serving session control node as well as the UE initiated server capability, and that the interrogating session control node determines that the previously used, i.e. the stored, serving session control node is not equipped with the one or more UE initiated server capabilities.

This triggers the serving session control node to determine whether any other serving session control node is more appropriate to be selected. As such, the interrogating session control node transmits a user authorization request message to the HSS comprising a request for all server capabilities for the serving session control node, i.e. the "standard" server capabilities as well as the one or more UE initiated server capabilities.

The interrogating session control node then receives, from the HSS, a user authorization answer message comprising all these server capabilities. This enables the interrogating session control node to select a serving session control node based on all the server capabilities.

In a second aspect of the present disclosure, there is provided a method of supporting selection of a serving session control node, for a User Equipment, UE, in an Internet Protocol, IP, Multimedia Subsystem, IMS, telecommunication network.

The method comprising the steps of:
receiving, by a Home Subscriber Server, from an interrogating session control node, a user authorization request message comprising a UE capability feature mappable to a UE initiated server capability for said serving session control node;
mapping, by said Home Subscriber Server, said received UE capability feature to said UE initiated server capability for said serving session control node;
transmitting, by said Home Subscriber Server, to said interrogating session control node, a user authorization answer message comprising said server capability for said serving session control node such that said interrogating session control node can select a serving session control node based on said server capability.

It is hereby submitted that the advantages and features associated with the first aspect of the present disclosure also relate, mutatis mutandis, to the second aspect of the present disclosure.

Following the above described second aspect of the present disclosure, the Home Subscriber Server is able to map, i.e. translate, the UE capability feature to a UE initiated server capability. The UE initiated sever capability thus indicates a preferred, or required, capability that the serving session control node is able to facilitate. The UE initiated server capability is then transmitted, by the Home Subscriber Server, to the interrogating session control node thereby facilitating that the interrogating session control node is able to efficiently select a serving session control node.

In an example, the user authorization answer message comprises any of:
an identification of a serving session control node;
one or more server capabilities as well as said one or more UE initiated server capabilities.

In a third aspect of the present disclosure, there is provided a method of supporting selection of a serving session control node in an Internet Protocol, IP, Multimedia Subsystem, IMS, telecommunication network, said method comprising the steps of:
transmitting, by said UE, a Session Initiation Protocol, SIP, register request message for registering said UE in said IMS telecommunication network, wherein said SIP register message comprises a UE capability feature mappable to a server capability for said serving session control node.

It is hereby submitted that the advantages and features associated with the first and second aspect of the present disclosure also relate, mutatis mutandis, to the third aspect of the present disclosure.

The UE is thus equipped for inserting, in the SIP register message, the UE capability feature which is mappable, i.e. which can be translated, to the UE initiated server capability.

In a fourth aspect of the present disclosure, there is provided an interrogating session control node arranged for selecting a serving session control node in an Internet Protocol, IP, Multimedia Subsystem, IMS, telecommunication network, for a User Equipment, said interrogating session control node comprising:

receive equipment arranged for receiving a Session Initiation Protocol, SIP register message for registering said UE in said IMS telecommunication network, wherein said SIP register message comprises a UE capability feature mappable to a server capability for said serving session control node;

transmit equipment arranged for transmitting to a Home Subscriber Server, a user authorization request message comprising said UE capability feature;

Wherein said receive equipment is further arranged for receiving from said Home Subscriber Server, a user authorization answer message comprising one or more UE initiated server capabilities for a serving session control node;

Wherein said interrogating session control node further comprises:

process equipment arranged for selecting a serving session control node based on said one or more received UE initiated server capabilities in said user authorization answer message.

It is hereby submitted that the advantages and features associated with the first, second and third aspect of the present disclosure also relate, mutatis mutandis, to the fourth aspect of the present disclosure.

In an example, the receive equipment is further arranged for receiving said user authorization answer message comprising said one or more UE initiated server capabilities as well as an identification of a serving session control node.

In a further example, the process equipment is further arranged for determining that said identified serving session control node is equipped with said one or more UE initiated server capabilities thereby selecting said identified serving session control node.

In another example, process equipment is further arranged for determining that said identified serving session control node is not equipped with said one or more UE initiated server capabilities, wherein said transmit equipment is further arranged for transmitting, triggered by said determining step, to said Home Subscriber Server, a user authorization request message comprises a request for server capabilities for said serving session control node, and wherein said receive equipment is further arranged for receiving, from said Home Subscriber Server, a user authorization answer message comprising one or more server capabilities as well as said one or more UE initiated server capabilities, and wherein said process equipment is further arranged for selecting a serving session control node based on said one or more received UE initiated server capabilities and based on said one or more server capabilities.

In a fifth aspect, there is provided a Home Subscriber Server, HSS, arranged for supporting selection of a serving session control node, for a User Equipment, UE, in an Internet Protocol, IP, Multimedia Subsystem, IMS, telecommunication network, said HSS comprising:

receive equipment arranged for receiving, from an interrogating session control node, a user authorization request message comprising a UE capability feature mappable to a server capability for said serving session control node;

process equipment arranged for mapping, by said Home Subscriber Server, said received UE capability feature to said server capability for said serving session control node;

transmit equipment arranged for transmitting, to said interrogating session control node, a user authorization answer message comprising said server capability for said serving session control node such that said interrogating session control node can select a serving session control node based on said server capability.

It is hereby submitted that the advantages and features associated with the first, second, third and fourth aspect of the present disclosure also relate, mutatis mutandis, to the fifth aspect of the present disclosure.

In an example, the user authorization answer message comprises any of:

an identification of a serving session control node;
one or more server capabilities as well as said one or more UE initiated server capabilities.

In a sixth aspect of the present disclosure, there is provided a User Equipment, UE, arranged for supporting selection of a serving session control node in an Internet Protocol, IP, Multimedia Subsystem, IMS, telecommunication network, said UE comprising:

transmit equipment arranged for transmitting a Session Initiation Protocol, SIP, register request message for registering said UE in said IMS telecommunication network, wherein said SIP register message comprises a UE capability feature mappable to a server capability for said serving session control node, wherein said UE capability feature is a feature indicating that said UE supports Voice over New Radio.

Voice over New Radio, NR, means voice calls can be made on 5G New Radio. This may require NR in 5G to support voice capabilities, being dimensioned for voice coverage. Handover of voice calls between 5GS and 5G Evolved Packet System, EPS, can be performed, based on measurement reports provided by the UE.

The above means that, in selection of the serving session control node, the interrogating session control node may take into account the fact that the UE supports Voice over NR. That particular feature may introduce a UE initiated server capability to which a serving session control node is to be compliant with.

In accordance with the present disclosure, the UE capability feature that indicates that the UE supports Voice over New Radio may have multiple values, thereby indicating, for example, the gradation in which the UE supports that particular feature.

In a seventh aspect of the present disclosure, there is provided computer program product comprises a computer readable medium having instructions stored thereon which, when executed by a server in an Internet Protocol, IP, Multimedia Subsystem, IMS telecommunication network, cause said server to implement a method in accordance with any of the examples as provided above.

The above mentioned and other features and advantages of the disclosure will be best understood from the following description referring to the attached drawings. In the drawings, like reference numerals denote identical parts or parts performing an identical or comparable function or operation.

DETAILED DESCRIPTION

Some of the examples contemplated herein will now be described more fully with reference to the accompanying drawings. Other examples, however, are contained within the scope of the subject matter disclosed herein, the disclosed subject matter should not be construed as limited to only the examples set forth herein; rather, these examples are provided by way of example to convey the scope of the subject matter to those skilled in the art.

Figure 1:
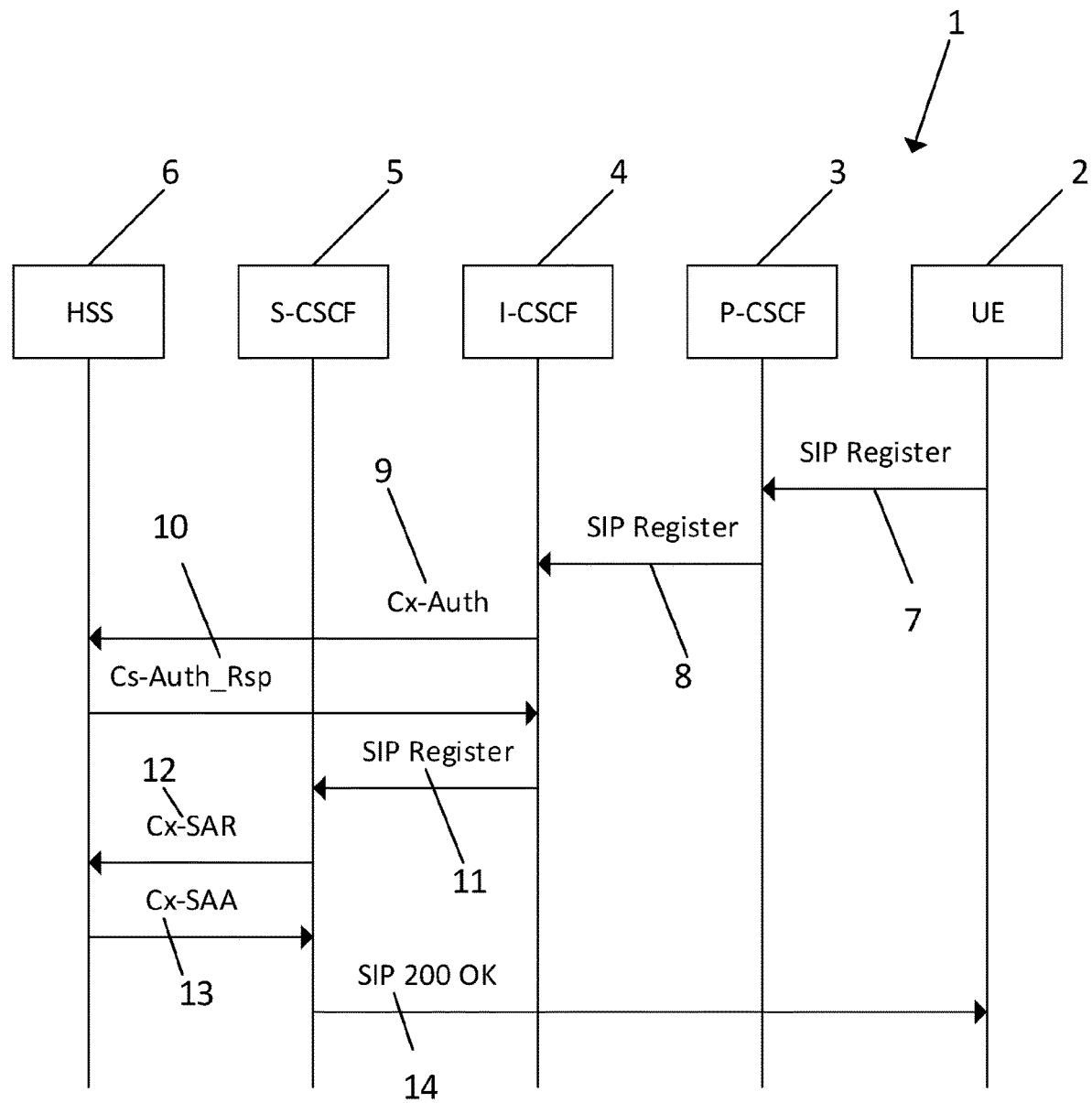
FIG. 1 schematically illustrates a flow chart indicating the process of selecting a serving session control node in accordance with the prior art.

FIG. 1 schematically illustrates a flow chart 1 indicating the process of selecting a serving session control node in accordance with the prior art.

Here, multiple nodes of the Internet Protocol, IP, Multimedia Subsystem, IMS, telecommunication network are involved, being a proxy serving control node implemented as a Proxy-Call Session Control Function, P-CSCF, 3, a interrogating serving control node implemented as an Interrogating-Call Session Control Function, I-CSCF 4, a Serving-Call Session Control Function, S-CSCF 5, and a Home Subscriber Server, HSS, 6. A User Equipment, UE, 2 is also involved in the process, wherein the UE 2 is a Session Initiation Protocol, SIP, capable UE 2.

The process starts by the UE 2 transmitting a SIP Register message 7 for registering the UE 2 in the IMS telecommunication network. The SIP register message 7 is received by the P-CSCF 3.

The P-CSCF typically acts as the ingress, and the egress node to and from the IMS telecommunication network with respect to the UE 2. The P-CSCF may have numerous responsibilities, including onward routing of SIP register messages to the correct nodes in the IMS telecommunication network.

As such, the P-CSCF 3 forwards, i.e. routes, 8 the SIP Register message to the I-CSCF 4. That is, the I-CSCF receives the SIP register message for registering the UE 2 in the IMS telecommunication network.

Authorization to the IMS telecommunication network is thus requested for the UE 2. If the UE is authorized, the I-CSCF 4 expects either an S-CSCF name, for example if it is already stored for the particular UE 2, or server capabilities, for example if no S-CSCF name is stored, to select a suitable S-CSCF based on the support of those server capabilities.

Following the above, a Cx-Auth 9 message is sent, by the I-CSCF 4 to the Home Subscriber Server, HSS, 6. The authorization type in the message is set to "registration" for informing the HSS 6 of the intention of the message.

In this particular case, the UE 2 is authorized and location data for UE 2 does not exist, i.e. no S-CSCF name is stored in the HSS yet, and thus server capabilities are returned to the I-CSCF 4.

The server capabilities are included in the Cs-Auth_Rsp message 10 which is sent from the HSS 6 to the I-CSCF 4. The server capabilities may be directed to mandatory sever capabilities and optional server capabilities. Mandatory server capabilities indicate the capabilities of the S-CSCF which are mandatory, i.e. the S-CSCF should be able to inherently support those capabilities, and the optional server capabilities indicate the capabilities of the S-CSCF which are optional, i.e. the S-CSCF preferably support those capabilities.

The I-CSCF 4 continues in selecting a S-CSCF. This is based on the server capabilities received from the HSS 6. In this particular scenario the S-CSCF having reference numeral 5 is selected.

The I-CSCF 4 then forwards 11 the SIP register message to the selected S-CSCF 5 for continuing the registration process of the UE 2 in the IMS telecommunication network.

The S-CSCF 5 may authenticate the UE 2 based on the received SIP register message any may store its name in the HSS 6 using a Cx-SAR message 12, which Cx-SAR message 12 is acknowledged, by the HSS 6, in a Cx-SAA message 13. Finally, the S-CSCF 5 transmits an SIP 200 OK message 14 back to the UE 2 thereby informing the UE 2 that the registration is completed.

Figure 2:
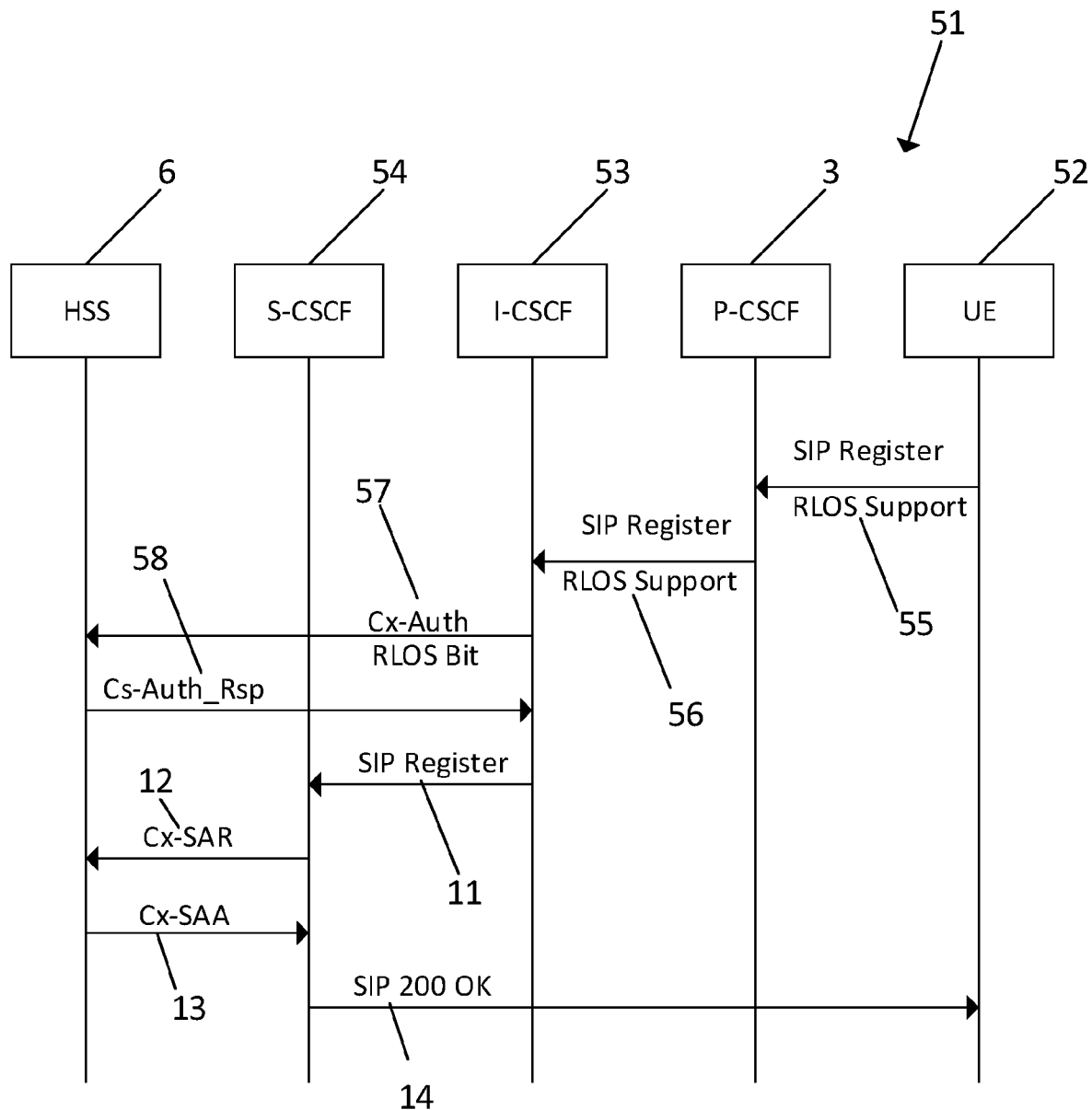
FIG. 2 schematically illustrates a flow chart indicating a process of selecting a serving session control node in accordance with the present disclosure.

FIG. 2 schematically illustrates a flow chart 51 indicating a process of selecting a serving session control node in accordance with the present disclosure.

The present disclosure is directed to the concept of dynamic server capabilities to adapt to different operators and networks. Currently, the server capabilities assist the I-CSCF in order to select a S-CSCF, but the capabilities are provisioned only based on the information permanently available, which is the information administered by the operator, and that information is composed of the services required/authorized for the end users.

The present concept depicts a solution for the problem posed above in such a way that the I-CSCF is able to select an S-CSCF based on capabilities that are actually required by the UE during the IMS registration procedure. This is solved in that the SIP register message comprises a UE capability feature which is mappable, by the HSS, to a UE initiated server capability for the S-CSCF.

The above is achieved, in a particular detailed example of the present concept, in that the procedure of authorization of the UE in the telecommunication network is enhanced such that the I-CSCF is informed of an (additional) UE initiated server capability which is to be taken into account in the selection process of selecting an S-CSCF.

Similarly, when there is an S-CSCF already assigned for a particular UE, and the UE indicates any UE capability feature, the HSS may return not only the name of the stored S-CSCF as per current procedures, but may additionally include the UE initiated server capability or capabilities. This allows the I-CSCF to check, within its current configuration, whether the stored S-CSCF, i.e. the one returned by the HSS, also supports the UE initiated server capability. If not, a new S-CSCF may be selected, which new S-CSCF does actually support the UE initiated server capability or capabilities. This is depicted in more detail in FIG. 3.

In the scenario depicted in FIG. 2, the UE 52 starts the registration process by transmitting an SIP register message 55 to the P-CSCF 3. Here, the SIP register message comprises a UE capability feature mappable to a server capability for the S-CSCF. In this particular case, the UE capability feature is related to Restricted Local Operator Services, RLOS, support. The P-CSCF 3 forwards 56 the SIP register message to the I-CSCF 53.

It is noted that the present example is directed to Restricted Local Operator Services, RLOS. The present disclosure is, however, applicable to all kinds of UE capability features and should not be limited to the RLOS.

In this particular case, the I-CSCF 53 sets an RLOS bit in the Cx-Auth message, i.e. the user authorization request message, which is sent 57 to the HSS 6. The HSS 6 then maps the received UE capability feature, i.e. the RLOS bit, to the UE initiated server capability for the S-CSCF.

The HSS 6 will then sent an Cs-Auth_Rsp message 58 back to the I-CSCF 53, which message 58 comprises all server capabilities to which the S-CSCF 54 should adhere to. This thus includes the UE initiated server capability as well as the remaining server capabilities, for example those set by the operator.

Figure 3:
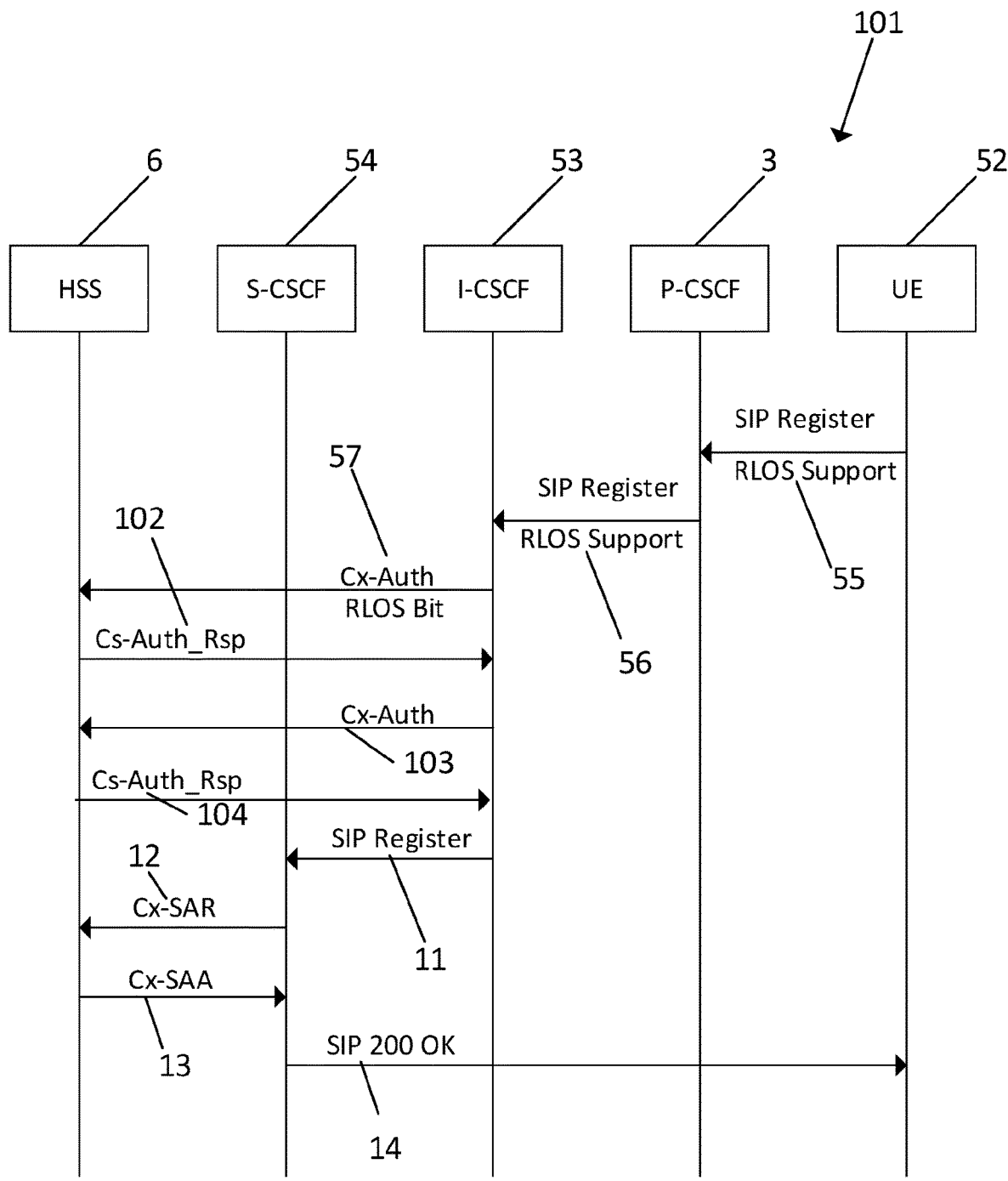
FIG. 3 schematically illustrates another flow chart indicating a process of selecting a serving session control node in accordance with the present disclosure.

FIG. 3 schematically illustrates another flow chart 101 indicating a process of selecting a serving session control node in accordance with the present disclosure.

The first steps of the flow chart are similar to the steps of the flow chart as indicated in FIG. 2. The main difference is made clear in the Cs-Auth_Rsp message 102.

Here, the HSS 6 may fetch the stored S-CSCF, i.e. the one that was previously selected for the UE, and returns the response in the Cs-Auth_Rsp message 102. The HSS may thus fetch the locally provisioned configuration mapping, based on information received, and finds a match of server capabilities for the indicates UE's capabilities, for example the RLOS bit set corresponds to a "capability nr. 2". This match may be understood by the I-CSCF as an indication that, for this specific registration, a check is to be performed for the provided S-CSCF currently assigned since it may not support capability 2, and that thus another S-CSCF is to be selected.

Since there might be a mandatory capability received together with the current S-CSCF, the I-CSCF may check that the received S-CSCF name matches the required mandatory capabilities. i.e. the capability "nr. 2". If the check fails, i.e. the S-CSCF does not support server capability 2, the I-CSCF may initiate S-CSCF reallocation by request explicitly all the mandatory and optional server capabilities for the UE. The indication of the RLOS UE capability support is then again included in such a Cx-Auth message 103.

The HSS then returns, in the Cs-Auth_Rsp message 104, both the provisioned data and the server capability mapped from the current UE capability, i.e. RLOS indication corresponds to server capability 2, as described in previous steps. The registration then continues in a standard manner just like as described earlier.

In a detailed example, the present invention is pertained to the concept of dynamic server capabilities based on RLOS UE capabilities indicated in RLOS media feature tag) and other existing/future feature tags instead of the currently provisioned and permanent capabilities. This allows the HSS to adapt the S-CSCF capabilities to the UE requirements based on additional information received over existing interfaces or even dynamically stored information in order to select the most suitable S-CSCF for a given UE, and additionally improve efficiently by only selecting S-CSCF providing specific support for services when strictly necessary.

Figure 4:
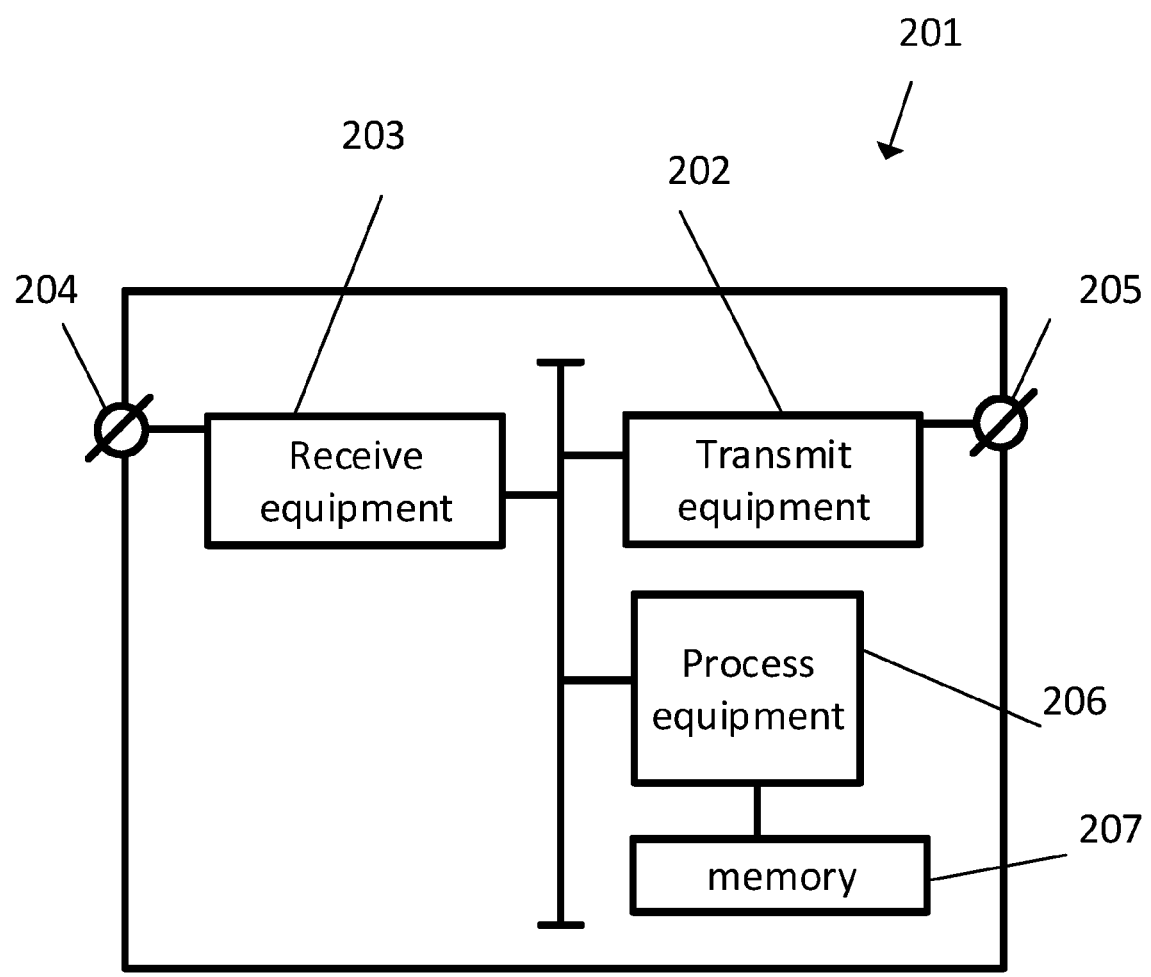
FIG. 4 schematically illustrates an interrogating session control node in accordance with the present disclosure.

FIG. 4 schematically illustrates an interrogating session control node 201 in accordance with the present disclosure.

The interrogating session control node 201 is arranged for selecting a serving session control node in an Internet Protocol, IP, Multimedia Subsystem, IMS, telecommunication network, for a User Equipment.

The interrogating session control node 201 comprising:
  receive equipment 203 arranged for receiving, via a receiving terminal 204, a Session Initiation Protocol, SIP register message for registering said UE in said IMS telecommunication network, wherein said SIP register message comprises a UE capability feature mappable to a server capability for said serving session control node;
  transmit equipment 202 arranged for transmitting, via a transmitting terminal 205, to a Home Subscriber Server, a user authorization request message comprising said UE capability feature;
  Wherein said receive equipment 204 is further arranged for receiving from said Home Subscriber Server, a user authorization answer message comprising one or more UE initiated server capabilities for a serving session control node;
  Wherein said interrogating session control node further comprises:
    process equipment 206, coupled to a memory 207, arranged for selecting a serving session control node based on said one or more received UE initiated server capabilities in said user authorization answer message.

Figure 5:
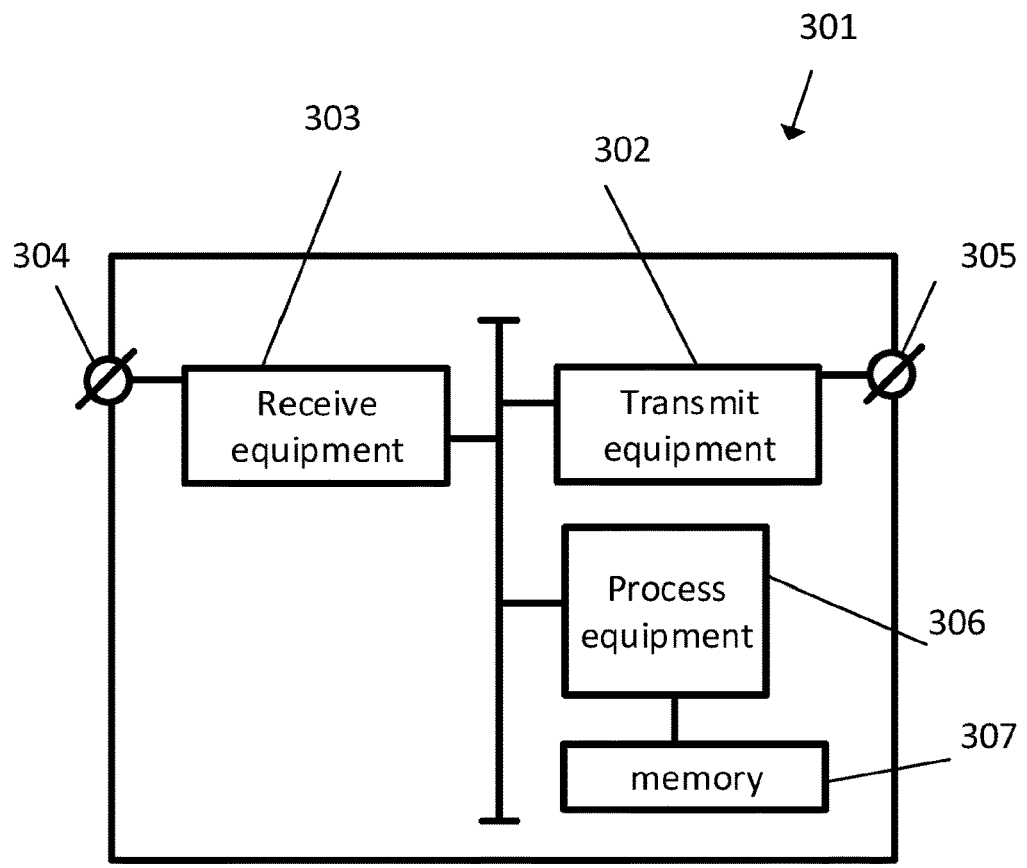
FIG. 5 schematically illustrates a Home Subscriber Server in accordance with the present disclosure.

FIG. 5 schematically illustrates a Home Subscriber Server 301 in accordance with the present disclosure.

The Home Subscriber Server, HSS, 301 is arranged for supporting selection of a serving session control node, for a User Equipment, UE, in an Internet Protocol, IP, Multimedia Subsystem, IMS, telecommunication network.

The HSS 301 comprising:
  receive equipment 303 arranged for receiving, via a receiving terminal, from an interrogating session control node, a user authorization request message comprising a UE capability feature mappable to a server capability for said serving session control node;
  process equipment 306, coupled to a memory 307, and arranged for mapping, by said Home Subscriber Server, said received UE capability feature to said server capability for said serving session control node;
  transmit equipment 302 arranged for transmitting, via a transmitting terminal 305, to said interrogating session control node, a user authorization answer message comprising said server capability for said serving session control node such that said interrogating session control node can select a serving session control node based on said server capability.

Figure 6:
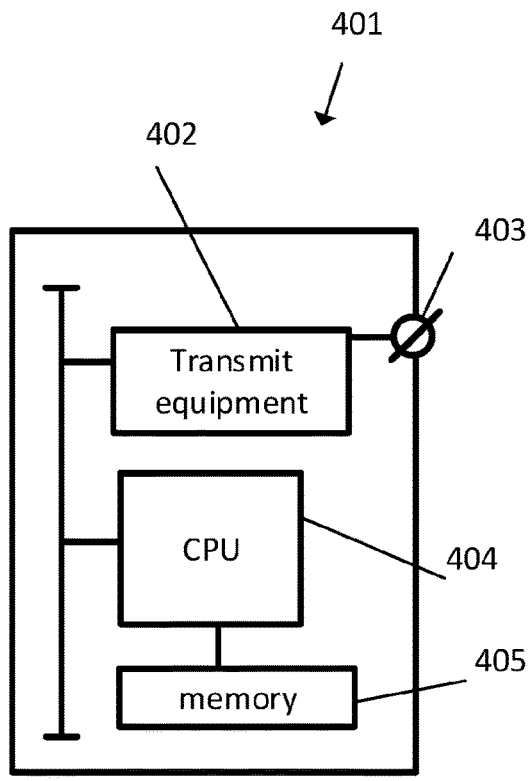
FIG. 6 schematically illustrates a User Equipment in accordance with the present disclosure.

FIG. 6 schematically illustrates a User Equipment in accordance with the present disclosure.

The User Equipment, UE, 401 is arranged for supporting selection of a serving session control node in an Internet Protocol, IP, Multimedia Subsystem, IMS, telecommunication network, said UE comprising:
  transmit equipment 402 arranged for transmitting, via a transmitting terminal 403, a Session Initiation Protocol, SIP, register request message for registering said UE in said IMS telecommunication network, wherein said SIP register message comprises a UE capability feature mappable to a server capability for said serving session control node. The UE 401 further comprises a CPU 404, connected to a memory 405.

The present disclosure has several advantages over the prior art.

Server selection can be based on dynamic conditions such as current mobile terminal, UE, capabilities/features, etc. instead of provisioned and permanent information for an IMS subscriber.

Easier Operation and Maintenance of a network, since I-CSCFs configuration is not impacted with new features. Instead, I-CSCF keeps the current capabilities information and configuration to select an S-CSCF. The I-CSCF may, however, be amended in that it is able to set a corresponding bit in UAR-flags.

The present disclosure allows the HSS to act as orchestrator to distribute/allocate the users based on dynamic conditions in a centralized manner, given that HSS has access or may even retrieve all the information: services subscribed, International Mobile Station Equipment Identity Software version, IMEISV, features supported by the mobile terminal, etc.

The present disclosure further Allows subscriber-based policies instead of static mapping of S-CSCF addresses per UE Capability in the I-CSCF.

Other variations to the disclosed examples can be understood and effected by those skilled in the art in practicing the claimed disclosure, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid state medium supplied together with or as part of other hardware, but may also be distributed in other forms, such as via the internet or wired or wireless telecommunication systems. Any reference signs in the claims should not be construed as limiting the scope thereof.

The present disclosure is not limited to the examples as disclosed above, and can be modified and enhanced by those skilled in the art beyond the scope of the present disclosure as disclosed in the appended claims without having to apply inventive skills.

The invention claimed is:

1. A method of selecting a serving session control node in an Internet Protocol, IP, Multimedia Subsystem, IMS, telecommunication network, for a User Equipment, UE, the method comprising:
   receiving, by an interrogating session control node, a Session Initiation Protocol, SIP register message for registering the UE in the IMS telecommunication network, the SIP register message comprising a UE capability feature mappable, by a Home Subscriber Server, HSS, to a UE initiated server capability supported by the serving session control node;
   transmitting, by the interrogating session control node, to the HSS, a user authorization request message comprising the UE capability feature;
   in response to the user authorization request message, receiving, by the interrogating session control node, from the HSS, a user authorization answer message comprising one or more UE initiated server capabilities supported by the serving session control node; and
   selecting, by the interrogating session control node, the serving session control node based on the one or more received UE initiated server capabilities in the user authorization answer message.

2. The method in accordance with claim 1, wherein the receiving further comprises:
   receiving, by the interrogating session control node, the user authorization answer message comprising the one or more UE initiated server capabilities and an identification of a serving session control node.

3. The method in accordance with claim 2, wherein the selecting further comprises:
   determining, by the interrogating session control node, that the identified serving session control node is equipped with the one or more UE initiated server capabilities thereby selecting the identified serving session control node.

4. The method in accordance with claim 2, wherein the selecting further comprises:
   determining, by the interrogating session control node, that the identified serving session control node is not equipped with the one or more UE initiated server capabilities;
   transmitting, by the interrogating session control node, triggered by the determining, to the Home Subscriber Server, a user authorization request message comprising a request for server capabilities for the serving session control node and comprising the UE capability feature;
   receiving, by the interrogating session control node, from the Home Subscriber Server, a user authorization answer message comprising one or more server capabilities and the one or more UE initiated server capabilities; and
   selecting, by the interrogating session control node, a serving session control node based on the one or more received UE initiated server capabilities and based on the one or more server capabilities.

5. A method of supporting selection of a serving session control node, for a User Equipment, UE, in an Internet Protocol, IP, Multimedia Subsystem, IMS, telecommunication network, the method comprising:
   receiving, by a Home Subscriber Server, HSS, from an interrogating session control node, a user authorization request message comprising a UE capability feature mappable to a UE initiated server capability supported by the serving session control node;
   in response to the user authorization request message, mapping, by the HSS, the received UE capability feature to the UE initiated server capability for supported by the serving session control node;
   transmitting, by the HSS, to the interrogating session control node, a user authorization answer message comprising the server capability supported by the serving session control node, the user authorization answer message triggering the interrogating session control node to select a serving session control node based on the server capability.

6. The method in accordance with claim 5, wherein the user authorization answer message comprises one or both of:
   an identification of a serving session control node; and
   one or more server capabilities and the one or more UE initiated server capabilities.

7. An interrogating session control node arranged for selecting a serving session control node in an Internet Protocol, IP, Multimedia Subsystem, IMS, telecommunication network, for a User Equipment, UE, the interrogating session control node comprising:
   receive equipment configured to:
     receive a Session Initiation Protocol, SIP register message for registering the UE in the IMS telecommunication network, the SIP register message comprising a UE capability feature mappable, by a Home Subscriber Server, HSS, to a server capability supported by the serving session control node;
   transmit equipment configured to:
     transmit, to the HSS, a user authorization request message comprising the UE capability feature;
   the receive equipment being further configured to:
     in response to the user authorization request message, receive from the HSS, a user authorization answer message comprising one or more UE initiated server capabilities supported by the serving session control node; and process equipment configured to:
   select the serving session control node based on the one or more received UE initiated server capabilities in the user authorization answer message.

8. The interrogating session control node in accordance with claim 7, wherein the receive equipment is further configured to receive the user authorization answer message comprising the one or more UE initiated server capabilities and an identification of a serving session control node.

9. The interrogating session control node in accordance with claim 8, wherein the process equipment is further configured to determine that the identified serving session control node is equipped with the one or more UE initiated server capabilities thereby selecting the identified serving session control node.

10. The interrogating session control node in accordance with claim 8, wherein the process equipment is further configured to determine that the identified serving session control node is not equipped with the one or more UE initiated server capabilities, wherein the transmit equipment is further configured to transmit, triggered by the determining, to the HSS, a user authorization request message comprises a request for server capabilities supported by the serving session control node, and wherein the receive equipment is further configured to receive, from the HSS, a user authorization answer message comprising one or more server capabilities and the one or more UE initiated server capabilities, and wherein the process equipment is further configured to select a serving session control node based on the one or more received UE initiated server capabilities and based on the one or more server capabilities.

11. A Home Subscriber Server, HSS, configured to support selection of a serving session control node, for a User Equipment, UE, in an Internet Protocol, IP, Multimedia Subsystem, IMS, telecommunication network, the HSS comprising:
   receive equipment configured to:
      receive, from an interrogating session control node, a user authorization request message comprising a UE capability feature mappable to a server capability supported by the serving session control node;
   process equipment configured to:
      in response to the user authorization request message, map the received UE capability feature to the server capability supported by the serving session control node; and
   transmit equipment configured to:
      transmit, to the interrogating session control node, a user authorization answer message comprising the server capability supported by the serving session control node, the user authorization answer message triggering the interrogating session control node to select a serving session control node based on the server capability.

12. The HSS in accordance with claim 11, wherein the user authorization answer message comprises one or both of:
   an identification of a serving session control node; and
   one or more server capabilities and the one or more UE initiated server capabilities.

* * * * *